DIFFERENTIAL RELAXATION OSCILLATOR
Filed May 15, 1967
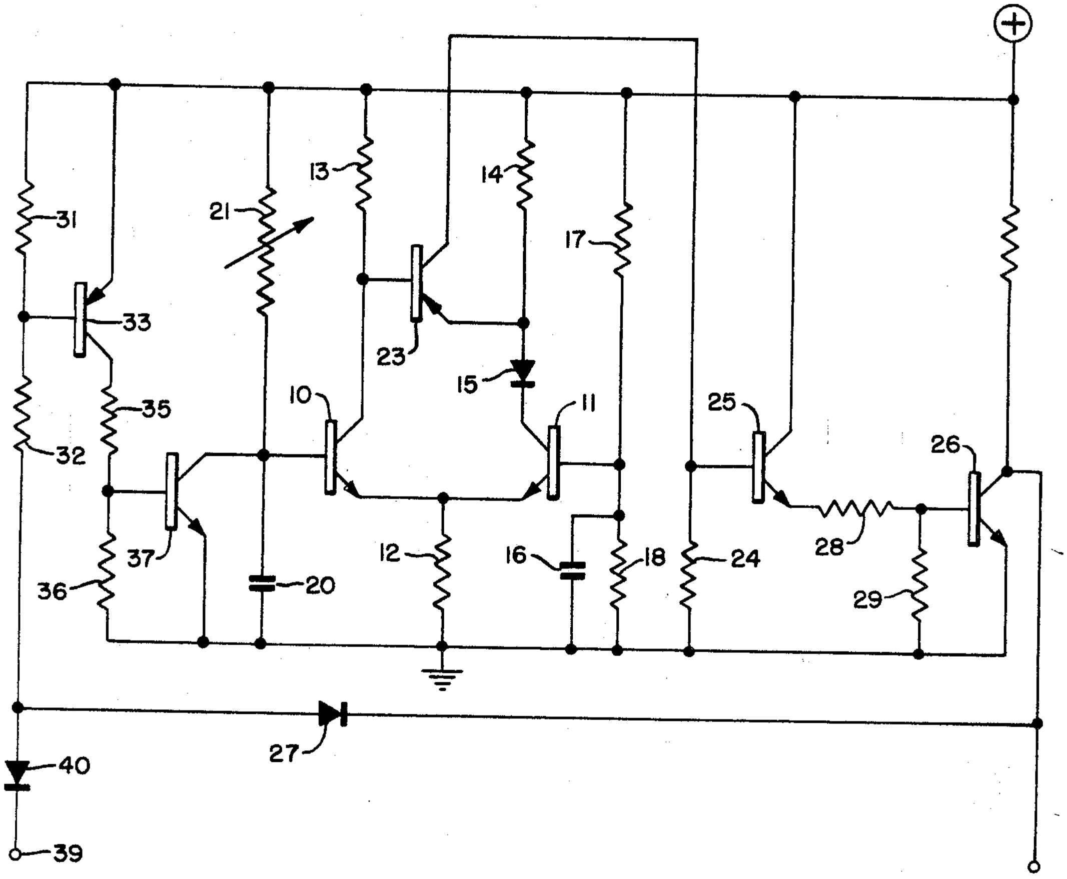
INVENTORS
JAMES A. JOHNSEN
JOHN L. PETERSON
BY La Valle Stah
ATTORNEY United States Patent Office 3,432,772
Patented Mar. 11, 1969

3,432,772

DIFFERENTIAL RELAXATION OSCILLATOR

James Alvin Johnsen, Mount Prospect, and John Loran Peterson, Chicago, Ill., assignors to Teletype Corporation, Skokie, Ill., a corporation of Delaware Filed May 15, 1967, Ser. No. 638,370
U.S. Cl. 331—111 5 Claims
Int. Cl. H03k 3/26; H03b 5/08, 5/18

ABSTRACT OF THE DISCLOSURE

A stable relaxation oscillator uses a resistive-capacitive timing network with a transistor differential amplifier to sense a reference point on the charge curve of the capacitor that is proportional to variations in that curve due to D.C. power supply variations. When this reference point is sensed, an output pulse is amplified by a Darlington loop amplifier and is fed back to a discharge transistor which is rendered conductive to provide a discharge path for the capacitor. The circuit then resets, and the capacitor is allowed to charge again, repeating the cycle.

*Background of the invention*

In the operation of data communications systems, computers, and other similar equipment, it is necessary to provide a source of clock pulses in order to coordinate all of the operations of various parts of the systems and equipment utilized. At the present time, many such sources of clock pulses utilize unijunction transistor oscillators. Unijunction oscillators, however, are difficult to adjust and have been extremely temperature sensitive in the voltage and frequency ranges encountered in data communications and computer systems. As a consequence, much care is required to insure that a unijunction oscillator provides clock pulses at the precise frequency which is required by the system with which such an oscillator is used; and the steps which must be taken to compensate for the short comings of the unijunction oscillator are expensive and complex.

*Summary of the invention*

In accordance with a preferred embodiment of the present invention, a differential amplifier is used as a basic element of a highly stable relaxation oscillator. One of a pair of transistors forming the differential amplifier is supplied with a base biasing potential obtained from a voltage divider connected across the power supply for the oscillator. The other transistor of the differential pair is connected to the junction between a timing capacitor and a charging resistor which also are connected across the oscillator power supply. The outputs at the collectors of the two transistors are connected to the emitter and base terminals of a sensing transistor which normally is rendered nonconductive. When a predetermined charge on the capacitor is reached to cause the differential transistor to which it is connected to conduct current in an amount equal to the current conducted by the other differential transistor, the sensing transistor is rendered conductive. The output pulse obtained when this occurs is amplified and is used to cause a discharge transistor, having its collector-emitter path connected across the timing capacitor, to be rendered conductive. The timing capacitor discharges through the discharge transistor to a predetermined value; and the circuit is reset to its inital condition in which the sensing transistor and the discharge transistor are nonconductive. This permits the capacitor to commence recharging, and the foregoing cycle of operation is repeated. Since the reference potential applied to the first one of the differential transistors varies directly proportionally to variations in the input power supply in the same manner that the charging rate for the timing capacitor varies, power supply variations have negligible affect on the timing cycle of the circuit. Similarly, if the two transistors of the differential pair are matched transistors, temperature variations also have relatively little affect on the timing cycle of the circuit.

*Brief description of the drawing*

A more complete understanding of the invention may be obtained by those skilled in the art from the following detailed description considered in conjunction with the accompanying drawing, the single figure of which is a schematic dagram of a differential relaxation oscillator according to a preferred embodiment of the invention.

*Detailed description*

Referring now to the drawing, a balanced differential amplifier consisting of a pair of matched NPN transistors 10 and 11 is provided. The transistors preferably are made on the same chip of semiconductor material, so that all of their characteristics are matched in every respect. The emitters of the transistors 10 and 11 are connected together through a common emitter resistor 12 to ground, and the collectors of each of the transistors are connected to the positive terminal of a D.C. power supply through a pair of equal resistors 13 and 14, with a diode 15 being connected between the collector of the transistor 11 and the resistor 14. A biasing potential is applied to the base of the transistor 11 through a voltage divider connected across the power supply and consisting of a pair of resistors 17 and 18, the values of which are chosen to cause the transistor 11 to conduct a predetermined current. The amount of current flowing through the transistor 11 varies directly with any variations which occur in the power supply voltage. A capacitor 16 of relatively large value is connected across the resistor 18 and is used to bypass transients having time durations of less than or of the same order of magnitude as the period of oscillation of the circuit.

The base of the transistor 10 is connected between the junction of a timing capacitor 20 and a variable charging resistor 21 which also are connected in series across the power supply. For any given application, the value of the resistor 21 is set initially to adjust the charging rate of the capacitor 20 to the desired rate. If the initial adjustment of the charging rate is not necessary, the resistor 21 may be replaced with a fixed resistor. Since the timing circuit or frequency determining circuit consisting of the capacitor 20 and the resistor 21 is connected across the same D.C. power supply which supplies power to the voltage divider consisting of the resistors 17 and 18, any variations of the power supply voltage which affect the charging rate of the capacitor 20 also are reflected in the simultaneous value of the reference voltage applied to the base of the transistor 11, thereby changing its conductivity accordingly.

As the charge on the capacitor 20 increases from an initial discharge value toward the positive potential of the power supply, the conduction of the transistor 10 increases from some minimum value, causing its collector voltage to drop in proportion to the charge being built-up on the capacitor 20. When the charge on the capacitor 20 reaches a voltage equal to the reference voltage applied to the base of the transistor 11, the voltage on the collector of the transistor 10 drops to a value which is sufficient to forward bias a PNP sensing transistor 23, switching if from nonconduction into conduction since the base of the transistor 23 is connected directly to the collector of the transistor 10 and the emitter of the transistor 23 is connected through the diode 15 to the collector of the transistor 11, thereby causing the voltage applied to the emitter of the transistor 23 to be positive with respect to the voltage applied to its base. The diode 15 is selected to have a forward voltage drop which is equal to the voltage drop across the emitter-base junction of the transistor 23. Thus, whenever the transistors 10 and 11 draw exactly the same collector current, the transistor 23 is rendered conductive.

When the transistor 23 becomes conductive, the potential on its collector rises from ground potential to a positive potential and is applied to the base of an input transistor 25 of a Darlington loop amplifier consisting of a pair of NPN transistor 25 and 26. This positive potential on the base of the transistor 25 causes the transistor 25 to be rendered conductive, which in turn causes a positive potential to be applied to the base of the output transistor 26 of the amplifier through the voltage divider consisting of the resistors 28 and 29. Since the emitter of the transistor 26 is connected to ground, the transistor 26 also is rendered conductive, causing the output obtained from its collector to drop from a positive potential to near ground potential.

Current then flows from the positive terminal of the power supply through a voltage divider, consisting of a pair of resistors 31 and 32, a blocking diode 27, and the collector-emitter path of the transistor 26 to ground, causing the potential appearing on the junction between the resistors 31 and 32 to drop from a relatively high positive potential to a potential which is negative with respect to the potential appearing on the emitter of a PNP transistor 33, thereby driving the transistor 33 into conduction. Current then flows through another voltage divider consisting of a pair of resistors 35 and 36, thereby causing the potential appearing on the base of an NPN transistor 37 connected to the junction between the resistors 35 and 36 to rise from ground potential to a positive value. Since the emitter of the transistor 37 is connected to ground, the transistor is driven into conduction, providing a short-circuit discharge path for the timing capacitor 20, which is connected across the collector-emitter circuit of the transistor 37. The capacitor 20 discharges rapidly through the transistor 37, rendering the transistor 10 less conductive. The transistor 23 then becomes nonconductive, causing the transistors 25 and 26 to be rendered nonconductive, which is followed by the return of the transistors 33 and 37 to a state of nonconduction. The next cycle of operation then commences.

The inherent delays in switching from conduction to nonconduction of the various transistors 23, 25, 26, 33, and 37 provide sufficient time to insure full discharge of the capacitor 20 prior to the time that the transistor 37 once again is rendered nonconductive. If such inherent delays are not sufficient to alow for full discharge of the capacitor 20, appropriate delay circuits necessarily need to be interposed into the circuit.

The recycling or capacitor discharge transistor 37 is operated in an inverse-beta relationship in order to obtain the lowest possible collector offset voltage of the transistor. This is accomplished by causing the direct current circuit for the transistor 37 to operate with a base-emitter current through the transistor which is approximately seven times the collector-emitter current flowing through the transistor upon full discharge of the capacitor 20. When the transistor 37 is conductive, the transistor 33 is in a state of saturation; so that the power supply, in effect, is connected directly to the resistor 35 in the base circuit of the transistor 37. At the same time, the power supply is connected to the collector of the transistor 37 through the resistor 21, which is chosen to have an impedance approximately ten times as large as the impedance of the resistor 35. As a consequence, the transistor 37 may be maintained at saturation at the collector offset voltage allowing the capacitor 20 to be discharged to that low voltage level, thereby providing increased temperature stability for the circuit.

In order to adapt the oscillator shown in FIGURE 1 to operate as a gated or start-stop oscillator, a gating input may be applied to the oscillator at an input terminal 39 connected to the anode of a diode 40, the cathode of which is connected to the junction of the resistor 32 and the diode 27. In order to render the oscillator inoperative, ground or a negative potential is applied to the terminal 39, causing current to flow from the source of positive potential of the terminal 39 through the resistors 31 and 32, thereby biasing the transistor 33 into conduction. As stated previously, when the transistor 33 is conductive, the transistor 37 is rendered conductive, providing a short circuit discharge path across the capacitor 20. Thus, so long as this ground or negative potential is present at the terminal 39, the oscillator is rendered inoperative.

To initiate operation of the oscillator, the potential at the terminal 39 is raised to a positive potential, back-biasing the diode 40 and isolating the input terminal 39 from the circuit. The oscillator then operates as if the input terminal 39 and diode 40 did not exist, and remains free running until the input potential at the terminal 39 once again is reduced to a negative or ground potential.

Modifications of the preferred embodiment of the differential relaxation oscillator shown in the drawing and in the foregoing detailed description, varied to fit particular operating conditions will be apparent to those skilled in the art, and the invention is not to be considered limited to the embodiment chosen for the purpose of disclosure and covers all changes and modifications which do not constitute departures from the true scope of the invention.

We claim:

1. An oscillator circuit including:

a timing network connected to a power supply for providing a time-varying output voltage;

means for establishing a reference voltage which is proportional to variations in the power supply voltage;

a pair of matched amplifier elements connected as a differential circuit, the conduction of one of the elements being controlled by the reference voltage and the conduction of the other element being controlled by the output voltage of the timing network, for providing an output indication whenever the amplifier elements draw substantially the same current; and means responsive to the output indication of the differential circuit for resetting the output voltage of the timing network to an initial value.

2. An oscillator circuit according to claim 1 further including switching means controlled by the outputs of the differentially-connected amplifier elements for providing said output indication whenever the amplifier elements draw substantially the same current.

3. An oscillator circuit including:

a power supply;

a frequency-determining network connected to the power supply for providing an output voltage which increases from a first value toward the power supply voltage at a predetermined rate;

means for establishing a reference voltage which varies directly with variations in the power supply voltage;

a pair of matched amplifier elements connected in a differential circuit, the conduction of one of the elements being controlled by the reference voltage and the conduction of the other element being controlled by the output voltage of the frequency-determining network, for providing an output indication whenever the amplifier elements draw substantially the same current; and means responsive to the output indication of the differential circuit for resetting the output voltage of the frequency-determining network ot the first value.

4. An oscillator according to claim 3 further including a switching device controlled by the outputs of the amplifier elements for providing said output indication whenever the amplifier elements draw substantially the same current.

5. A differential relaxation oscilator including:
- a power supply;
- a frequency-determining network including a resistor and capacitor connected in series across the power supply for providing an output voltage which increases from a first value towards the power supply voltage at a predetermined rate dependent upon the power supply voltage;
- means connected to the power supply for establishing a reference voltage which varies directly with variations in the power supply voltage;
- a sensing amplifier including a pair of matched amplifier elements connected in a balanced differential circuit, the conduction of one of the elements being controlled by the reference voltage and the conduction of the other element being controlled by the output voltage of the frequency-determining network;
- a first switching device controlled by the outputs of the amplifier elements, and normally providing a first output condition, for providing a second output condition whenever the amplifier elements draw substantially the same current; and

- a normally-open switching device connected in paralle with the capacitor and controlled by the output o the first switching device, being open when the firs output condition exists from the first switching devic and being closed when the second output conditio from the first switching device exists.

References Cited

UNITED STATES PATENTS

| | | | |
|---|---|---|---|
| 2,627,031 | 1/1953 | Moore | 331—143 |
| 3,156,875 | 11/1964 | Fiorino et al. | 331—111 |
| 3,317,855 | 5/1967 | Cho | 331—143 |
| 3,334,311 | 8/1967 | Kan et al. | 331—111 |
| 3,364,441 | 1/1968 | Rogers | 331—111 |

OTHER REFERENCES

Proc. of IEEE, "Nanovolt Transistor DC Amplifiers," p. 1147, August 1963.

JOHN KOMINSKI, *Primary Examiner.*

U.S. Cl. X.R.

330—14, 30, 69; 331—143, 172; 328—181